United States Patent
Van Zile, III et al.

(10) Patent No.: US 8,162,557 B2
(45) Date of Patent: Apr. 24, 2012

(54) MULTI-AXIS COUPLING APPARATUS FOR ADJUSTABLY MOUNTING MODULAR TOOLING MEMBERS

(75) Inventors: Donald Van Zile, III, New Baltimore, MI (US); Jeffery J. Dellach, Macomb, MI (US); Kenneth P. Dellach, Shelby Township, MI (US); Henry J. Brohl, III, Macomb, MI (US)

(73) Assignee: Norgren Automation Solutions, LLC, Clinton Township, MI (US)

( * ) Notice: Subject to any disclaimer, the term of this patent is extended or adjusted under 35 U.S.C. 154(b) by 695 days.

(21) Appl. No.: 11/453,535

(22) Filed: Jun. 15, 2006

(65) Prior Publication Data

US 2006/0291951 A1    Dec. 28, 2006

Related U.S. Application Data

(60) Provisional application No. 60/691,166, filed on Jun. 16, 2005.

(51) Int. Cl.
*F16C 11/00* (2006.01)

(52) U.S. Cl. ............ 403/96; 403/97; 403/385; 403/389; 403/396

(58) Field of Classification Search .................... 403/96, 403/97, 385, 389, 396, 118; 428/298.1
See application file for complete search history.

(56) References Cited

U.S. PATENT DOCUMENTS

| | | | |
|---|---|---|---|
| 1,416,386 A * | 5/1922 | Selah | 403/234 |
| 1,706,215 A | 3/1929 | Davidson | |
| 1,706,801 A * | 3/1929 | Merrill | 403/385 |
| 1,835,473 A * | 12/1931 | Davidson | 403/97 |
| 1,845,672 A * | 2/1932 | Maher | 403/343 |
| 2,461,762 A * | 2/1949 | O'Donnell | 403/385 |
| 2,876,027 A * | 3/1959 | Sulmonetti | 403/53 |
| 3,096,109 A * | 7/1963 | Callahan | 403/385 |
| 3,126,191 A * | 3/1964 | Holden | 403/97 |
| 3,349,927 A | 10/1967 | Blatt | |
| 4,078,821 A * | 3/1978 | Kitterman | 403/118 |
| 4,632,221 A * | 12/1986 | Stanford | 403/385 |
| 4,650,234 A | 3/1987 | Blatt | |
| 4,957,318 A | 9/1990 | Blatt | |
| 5,167,466 A | 12/1992 | Hsieh | |
| 5,222,854 A | 6/1993 | Blatt et al. | |
| 5,269,486 A * | 12/1993 | Hufford | 403/173 |
| 6,095,713 A | 8/2000 | Doyle et al. | |
| 6,349,912 B1 * | 2/2002 | Schauss et al. | 248/298.1 |
| 6,409,411 B1 | 6/2002 | Crorey | |
| 6,619,872 B2 | 9/2003 | Crorey et al. | |
| 6,626,629 B2 | 9/2003 | Herbermann et al. | |
| 2003/0015881 A1 | 1/2003 | Neveu | |

FOREIGN PATENT DOCUMENTS

DE    26 19 200 A1    11/1977

(Continued)

*Primary Examiner* — Victor MacArthur
(74) *Attorney, Agent, or Firm* — Young Basile Hanlon & MacFarlane P.C.

(57) ABSTRACT

A multi-axis coupling apparatus for adjustably mounting modular tooling members. The multi-axis coupling apparatus provides a first coupling member connectable to a substantially cylindrical boom for providing linear and rotational adjustment along and about a longitudinal axis of the cylindrical boom. A second coupling member is connected to the first coupling member and is connectable to a modular tooling member for providing adjustment to the modular tooling member about and along an axis extending at an angle to the longitudinal axis of the cylindrical boom.

11 Claims, 10 Drawing Sheets

FOREIGN PATENT DOCUMENTS

| | | | |
|---|---|---|---|
| DE | 19904246 C1 * | 11/2000 | |
| EP | 1 108 945 A1 | 6/2001 | |
| EP | 1180607 A1 * | 2/2002 | |
| FR | 589327 * | 5/1925 | |
| FR | 2834526 A1 * | 7/2003 | |
| JP | 08280707 A * | 10/1996 | |

* cited by examiner

MULTI-AXIS COUPLING APPARATUS FOR ADJUSTABLY MOUNTING MODULAR TOOLING MEMBERS

This application is related to, and claims the benefit of priority from, U.S. Provisional Patent Application Ser. No. 60/691,166, filed Jun. 16, 2005.

FIELD OF THE INVENTION

The present invention relates to a coupling apparatus for adjustably mounting modular tooling members, and in particular, a coupling apparatus that provides a combination of hinged, clamped, and matingly engaged joints to provide multi-axial adjustment of modular tooling members through adjustable engagements thereof.

BACKGROUND OF THE INVENTION

With the advent of mechanical manipulators and robotic arms, various tooling assemblies and workpiece-handling devices have been designed to quickly connect and disconnect to mechanical manipulators and robotic arms so that a variety of modular tooling assemblies can be utilized with the same manipulator. Flexibility and adjustability are preferably designed into the tooling assemblies so that the tooling assemblies can be configured for a variety of workpiece configurations. Previous tooling assemblies have utilized various sections of tubing interconnected by various brackets and mounts for fixturing a variety of workpieces, but such designs are typically rigid and provide little or no adjustment in the tooling assembly. Other designs have utilized slide mounts to allow the sections of tubing to be adjusted along a linear path of travel, but such designs have a limited amount of flexibility in that they provide only one degree or axis of adjustment.

It would be desirable to provide a multi-axis coupling apparatus for adjustably mounting modular tooling members that is reliable, inexpensive, and flexible in design.

SUMMARY OF THE INVENTION

The present invention provides a multi-axis coupling apparatus for adjustably mounting modular tooling members. The multi-axis coupling apparatus provides a primary joint connectable to a first substantially cylindrical boom rod and a second substantially cylindrical boom rod, and the primary joint having a first coupling member connected to a second coupling member. The first coupling member is independently, releasably connectable to the first substantially cylindrical boom rod for providing linear and rotational adjustment along and about a longitudinal axis of the first substantially cylindrical boom rod. The first coupling member has a first clamping member pivotally connected to a second clamping member by at least one link, wherein said link is pivotally connected to the first clamping member and the second clamping member by pivot pins. The second coupling member is independently, releasably connectable to the second substantially cylindrical boom rod, providing linear and rotational adjustment along and about a longitudinal axis of the second substantially cylindrical boom rod.

The primary joint may have an elbow portion for connecting the first coupling member to the second coupling member for rotational adjustment. The first coupling member may include a first substantially cylindrical base having a plurality of serrated teeth for matingly engaging a plurality of teeth formed on a second substantially cylindrical base on the elbow portion for providing unlimited rotational adjustment of the first coupling member with respect to the elbow portion about a first axis. In like manner, the elbow portion may include a third substantially cylindrical base having a plurality of teeth for engaging a plurality of teeth formed on a fourth substantially cylindrical base on the second coupling member for providing unlimited rotational adjustment of the second coupling member with respect to the elbow portion about a second axis. Furthermore, the first axis may extend substantially perpendicular to the second axis.

Alternatively, the first coupling member may be adjustable with respect to the second coupling member about a first axis. Furthermore, the second coupling member may include an integral substantially C-shaped structure connectable to the second substantially cylindrical boom rod for providing linear and rotational adjustment along and about the longitudinal axis of the second substantially cylindrical boom rod.

The multi-axis coupling apparatus may also include a secondary joint connectable to a third substantially cylindrical boom rod and the second substantially cylindrical boom rod. The secondary joint may have a third coupling member connected to a fourth coupling member. The third coupling member is releasably connectable to the second substantially cylindrical boom rod for providing linear and rotational adjustment along and about a longitudinal axis of the second substantially cylindrical boom rod. The fourth coupling member is connectable to the third substantially cylindrical boom rod for providing linear and rotational adjustment along and about a longitudinal axis of the third substantially cylindrical boom rod, wherein the longitudinal axis of the second substantially cylindrical boom rod extends at an angle to the longitudinal axis of the third substantially cylindrical boom rod.

The multi-axis coupling apparatus may further include a tertiary joint releasably connectable to one of the tooling members and the third substantially cylindrical boom rod, wherein the tertiary joint has a fifth coupling member connectable to the tooling member for rotatably adjusting the tooling member.

BRIEF DESCRIPTION OF THE DRAWINGS

The various other uses of the present invention will become more apparent by referring to the following detailed descriptions and drawings in which.

DESCRIPTION OF THE PREFERRED EMBODIMENT

Figure 1:
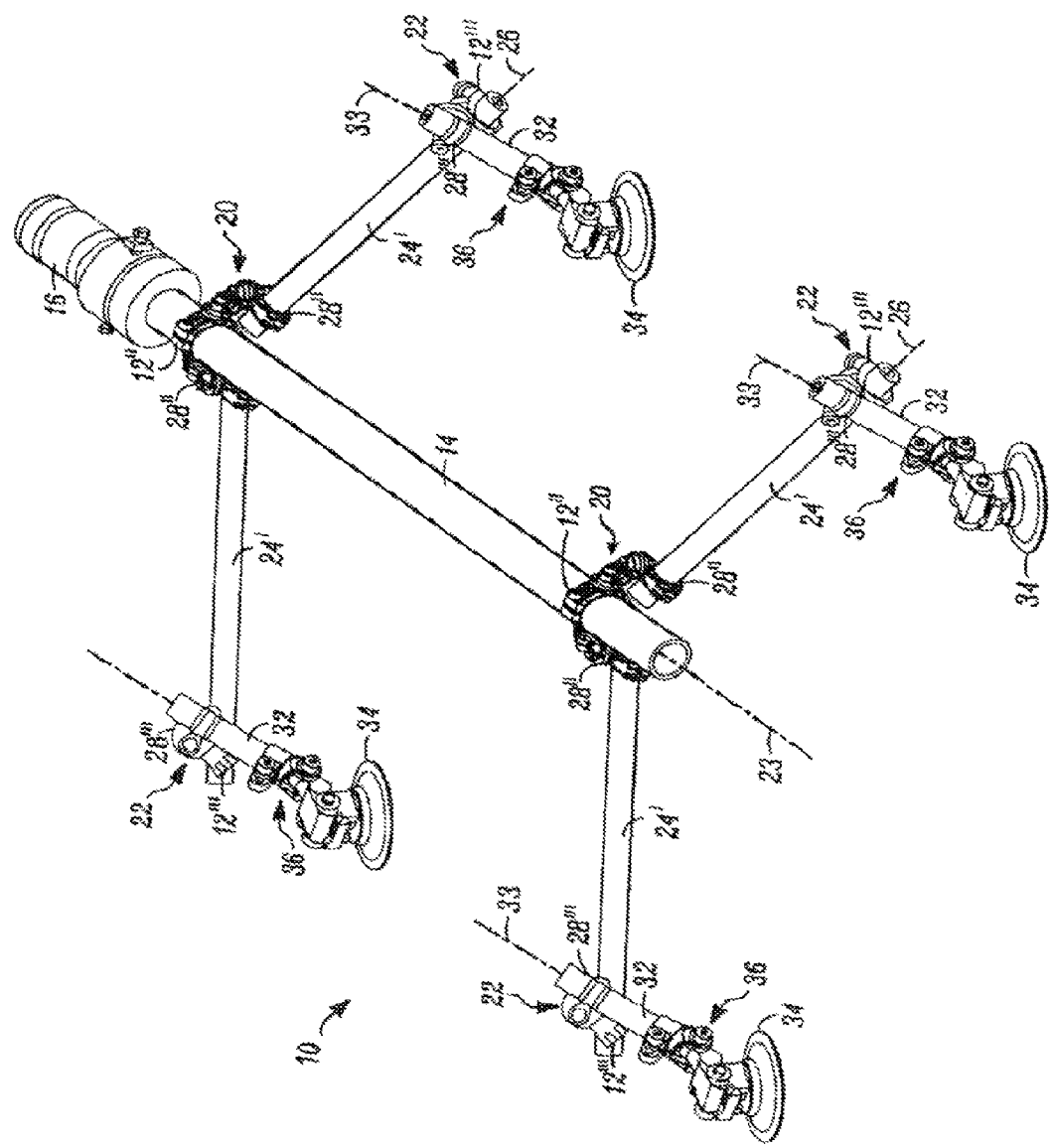
FIG. 1 is a perspective view showing one embodiment of the multi-axis coupling apparatus of the present invention.

FIGS. 1-8 illustrate a multi-axis coupling apparatus 10 of the present invention. The coupling apparatus 10 provides a hinged first coupling member 12', 12", 12' that is adjustably and releasably connectable to a substantially cylindrical first boom rod or master boom 14 or a substantially cylindrical second boom rod 24', 24", 24'. The master boom 14 may be fabricated from a substantially cylindrical pipe having a fitting 16 thereon wherein the fitting 16 may be attachable to a robotic arm (not shown) or a type of manipulator (not shown). A second coupling member 28', 28", 28''' is connected to the hinged first coupling member 12', 12", 12''', and both coupling members 12', 12", 12''', 28', 28", 28'' may be utilized to connect the master boom 14 to the second boom rod 24', 24", 24''' or may be utilized as a secondary joint to connect the second boom rod 24', 24", 24''' to a substantially cylindrical third boom rod 32. The hinged first coupling member 12', 12", 12''' and the second coupling member 28', 28", 28''' may take on several different forms, such as a boom mount 18, a swivel assembly 20, and a swivel mount 22, as best seen in FIGS. 3-6. These various types of first coupling members 12', 12", 12''', respectively, and second coupling members 28', 28", 28''', respectively, will be described in detail later in the specification.

Figure 2:
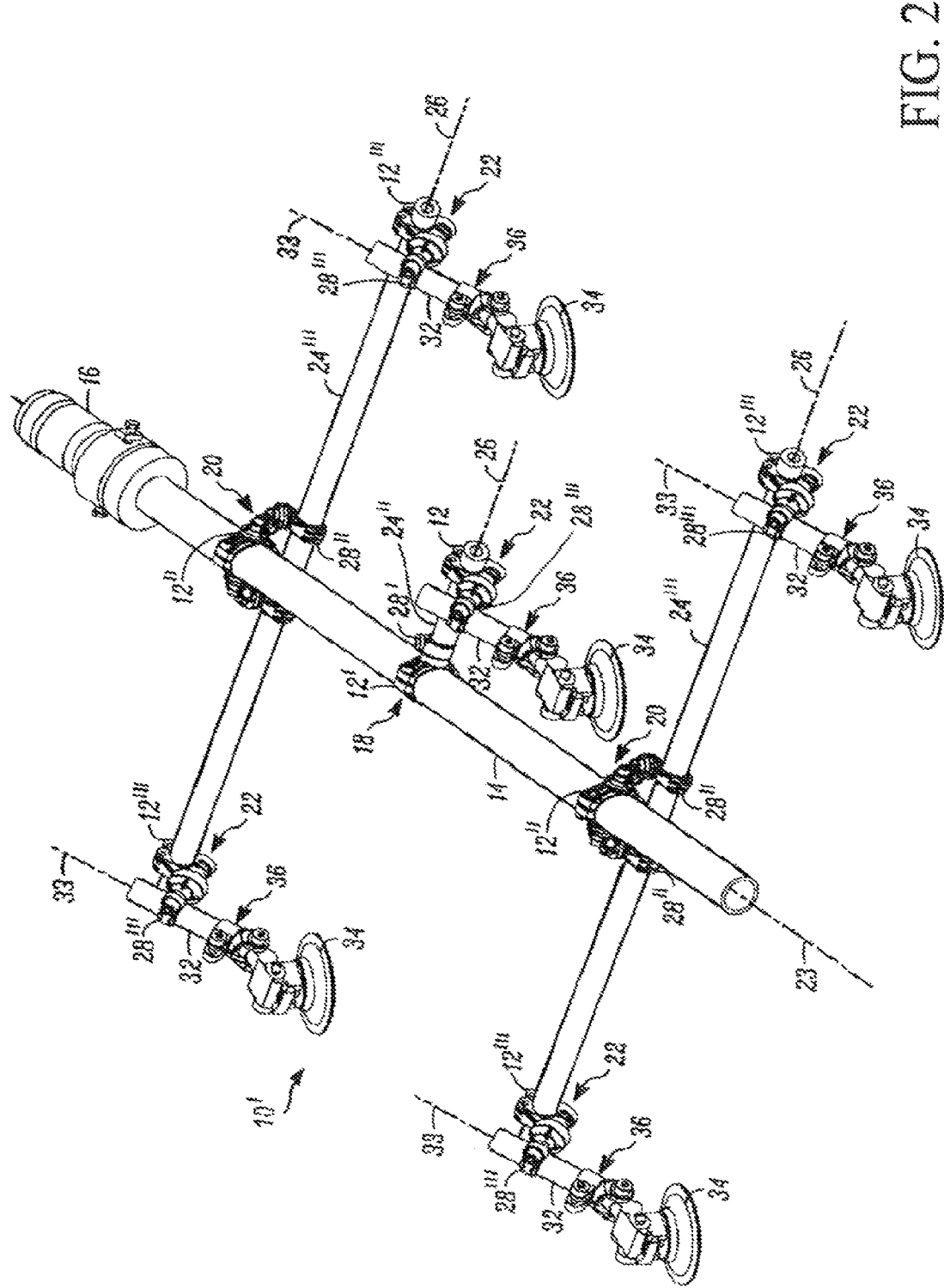
FIG. 2 is a perspective view showing a second embodiment of the multi-axis coupling apparatus of the present invention.

As seen in FIG. 1, the multi-axis coupling apparatus 10 may provide for a pair of hinged first coupling members 12" axially spaced along a longitudinal axis 23 of the master boom 14. FIG. 2 shows a multi-axis coupling apparatus 10' having three hinged first coupling members 12', 12" axially spaced along the longitudinal axis 23 of the master boom 14. The second coupling member 28', 28" is connected to each of the various hinged first coupling members 12', 12" and are releasably and adjustably connected to the second boom rods 24' wherein each of the second boom rods 24' has a longitudinal axis 26. The second boom rods 24' may be fabricated from high-strength, low-weight materials, such as aluminum, and may extend away from the master boom 14 such that the longitudinal axes 26 of the second boom rods 24' extend at various angles relative to the longitudinal axis 23 of the master boom 14. FIG. 1 shows four (4) second boom rods 24' extending at acute angles relative to the master boom 14, and FIG. 2 shows three (3) second boom rods 24' extending at substantially right angles to the master boom 14. The longitudinal axes 26 of the second boom rods 24' may also extend at various angles with respect to one another, as shown in FIG. 1, or the longitudinal axes 26 of the second boom rods 24' may be substantially parallel with one another, as shown in FIG. 2. At an opposite end of the second boom rods 24', the first and second coupling members 12''', 28''' are also utilized to connect the third boom rod 32 to each of the second boom rods 24'. The third boom rods 32 are substantially similar to the second boom rods 24, and each of the third boom rods 32 has a longitudinal axis 33 that extends at various angles relative to the longitudinal axis 26 of the second boom rod 24' in which the particular third boom rod 32 is connected thereto. FIG. 1 shows four (4) third boom rods 32 being utilized, and FIG. 2 shows five (5) third boom rods 32 being utilized. The opposite end of each of the third boom rods 32, away from the first and second coupling members 12''', 28''', support a tooling member, such as a vacuum cup 34, clamp (not shown), or gripper (not shown). Each vacuum cup 34 is connected to the third boom rod 32 through the use of a tertiary joint having a third coupling member 36, which will also be described in detail later in the specification. The use of the coupling members 12', 12", 12''', 28', 28", 28''', 36 in conjunction with the master boom 14 and the second and third boom rods 24', 32 provide the multi-axis coupling apparatus 10 with the ability to move and position the vacuum cups 34 in virtually any three-dimensional configuration, whereby the limits of adjustment are only limited by the length of the master boom 14 and the second and third boom rods 24', 32. It should be noted that although the subject application only describes a second and third boom rod 24', 32 connected to the first boom rod or master boom 14, the present invention is not limited to just a first, second and third boom rod 14, 24', 32. Rather, the present invention may provide for any number or combination of boom rods 14, 24', 32 to obtain the desired adjustment of the multi-axis coupling apparatus 10.

In order to connect the multi-axis coupling apparatus 10 to the master boom 14, the hinged first coupling member 12', 12", 12''' provides a pair of substantially similar, semi-cylindrical clamping members 38, 40, as best seen in FIGS. 3-6. The semi-cylindrical clamping members 38, 40 have their ends align with one another to form a substantial cylinder 42 for receiving the master boom 14 or second boom rod 24', 24", 24'''. A boss 44, 46 is formed at each end of each of the semi-cylindrical clamping members 38, 40. The boss 46 provides a substantially cylindrical widening at one end of the semi-cylindrical clamping members 38, 40 and provides a pair of open-ended slots 48 substantially midway along the boss 46 for receiving a pair of links 50. A pivot pin 52 extends through an aperture extending through the boss 46 of each clamping member 38, 40 along a longitudinal axis 54 that is substantially parallel to the longitudinal axis 23 of the master boom 14 or second boom rod 24. The pivot pins 52 also extend through apertures provided in the links 50, wherein the apertures in the links 50 are coaxially aligned with the aperture in the bosses 46. The pivot pins 52 pivotally secure the links 50 within the bosses 46, and the links 50 hingedly connect the semi-cylindrical clamping members 38, 40 to one another. The links 50 have a substantially hourglass shape, thereby providing an inner surface 56 that is substantially curved or arcuately shaped so as to receive and complement the cylindrical shape of the master boom 14 or second boom rod 24.

Figure 3:
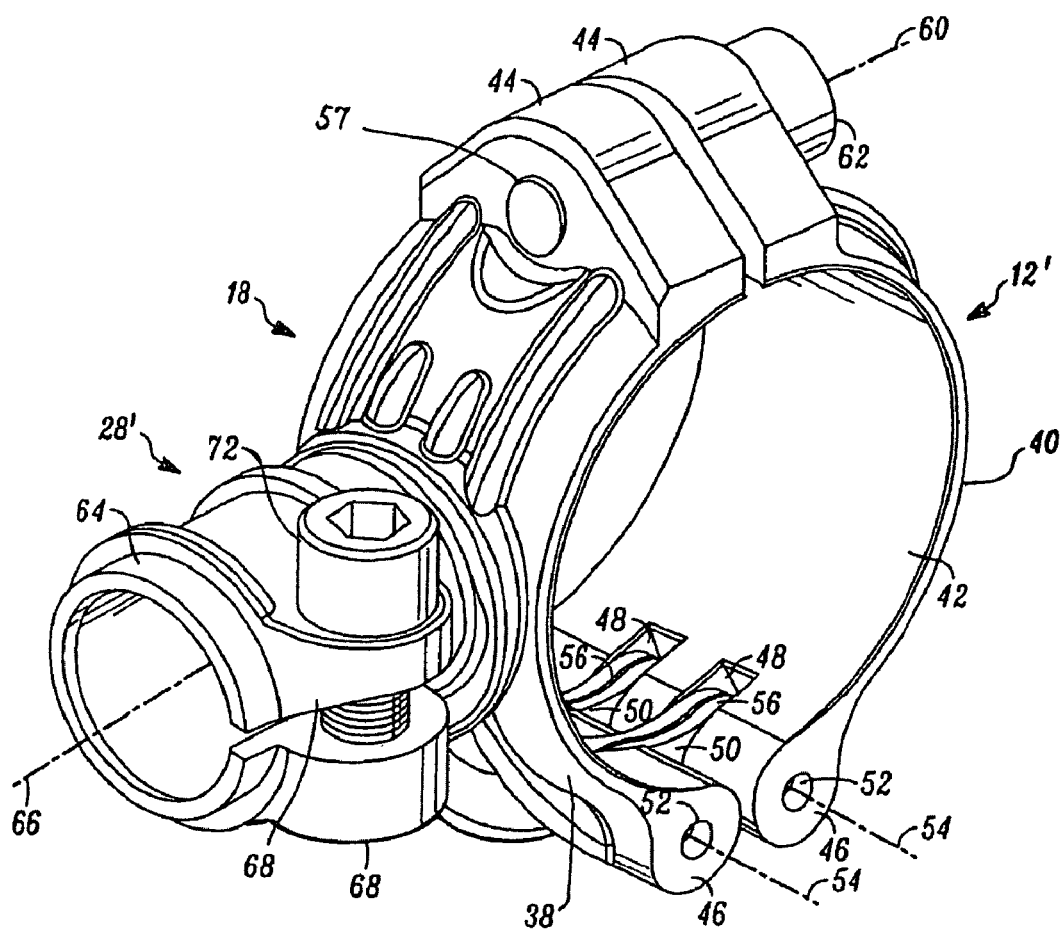
FIG. 3 is a perspective view of the boom mount of the multi-axis coupling apparatus of the present invention.
Figure 4:
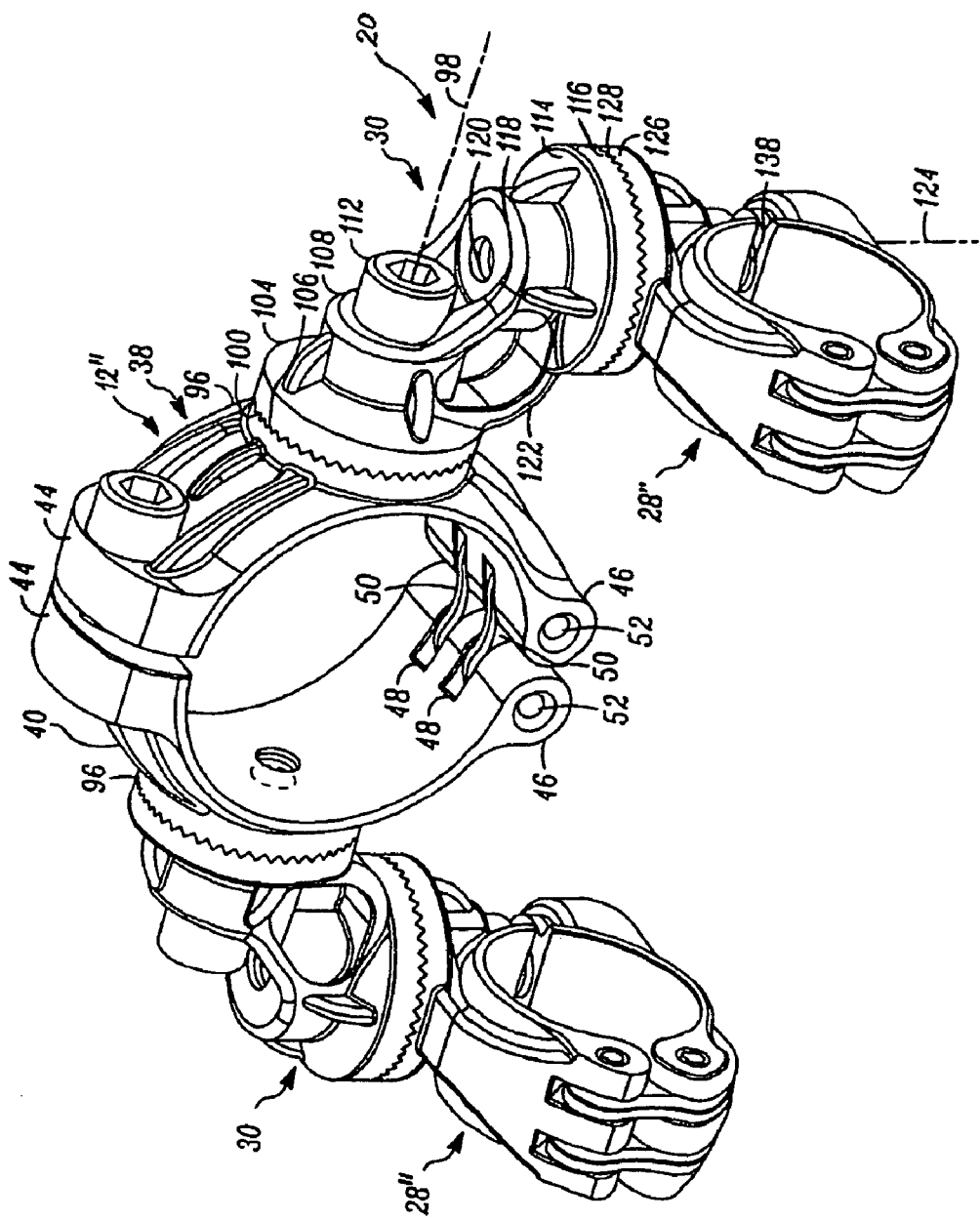
FIG. 4 is a perspective view showing a swivel assembly of the multi-axis coupling apparatus of the present invention.

As best seen in FIGS. 3 and 4, the bosses 44 on the opposite ends of the semi-cylindrical clamping members 38, 40 have coaxially aligned threaded apertures 57 extending therethrough along a longitudinal axis 60 that is substantially perpendicular to the longitudinal axis 23 of the master boom 14 or the second boom rod 24', 24", 24'''. A threaded fastener 62 extends through the threaded apertures 57 to allow for the loosening and tightening of the hinged first coupling member 12', 12", 12''' to the master boom 14 or second boom rod 24', 24", 24'''. The loosening and tightening of the hinged first coupling member 12', 12", 12''' allows for adjustment of the hinged first coupling member 12', 12", 12''' along the longitudinal axis 23 of the master boom 14 or the longitudinal axis 26 of the second boom rod 24', 24", 24'''. The hinged design of the first coupling member 12', 12", 12''' not only provides easy adjustment of the hinged first coupling member 12', 12", 12''' relative to the master boom 14 and second boom rod 24', 24", 24''', but the hinged design also allows for a greater range of acceptable tolerances when manufacturing the semi-cylindrical clamping members 38, 40, as opposed to manufacturing a similar component from a single, integral piece. This helps reduce the expense of manufacturing the clamping members 38, 40.

To connect the second boom rod 24', 24", 24''' to the master boom 14 at the primary joint, the first and second coupling members 12', 12", 12''', 28', 28", 28''' may take on two forms. In one embodiment, the hinged first coupling member 12', 12", 12''' and the second coupling member 28', 28", 28''' may take on the form of the boom mount 18, as illustrated in FIGS. 2 and 3. The boom mount 18 includes the hinged first coupling member 12', as previously described, and the second coupling member 28', which provides an integral substantially C-shaped cylindrical member 64 that extends integrally from an outer surface of one of the semi-cylindrical clamping members 38 for receiving the second boom rod 24". Although the illustrations only display the second coupling member 28' extending from one of the semi-cylindrical clamping members 38 of the hinged first coupling member 12', it should be noted that the present invention is not limited to such a design. Rather, the present invention anticipates that the second coupling member 28' may extend from one or both of the semi-cylindrical clamping members 38, 40 of the hinged first coupling member 12'. The C-shaped cylinder 64 has a longitudinal axis 66 that is substantially perpendicular to the longitudinal axis 23 of the master boom 14. At the open ends of the C-shaped cylinder 64, a pair of opposing bosses 68 extend integrally therefrom. Each boss 68 has a threaded aperture extending therethrough and coaxially aligned for receiving a threaded fastener 72. The threaded fastener 72 provides for the loosening and tightening of the C-shaped cylinder 64 about the second boom rod 24".

In another embodiment to connect the second boom rod 24', 24", 24''' to the master boom 14, the primary joint may take on the form of the swivel assembly 20, as seen in FIGS. 1-2 and 4, wherein an elbow portion 30 connects the second coupling member 28" to the first coupling member 12" for rotational adjustment about two distinct axes 98, 124. The swivel assembly 20 provides the hinged first coupling member 12', 12", 12''', as previously described, however, a substantially cylindrical base 96 extending integrally from an outer surface of the semi-cylindrical clamping members 38, 40 of the hinged first coupling member 12" may be formed substantially midway between bosses 44, 46. The cylindrical base 96 has a plurality of serrated teeth 100 integrally formed thereon and extending radially outward from the center of the cylindrical base 96. The cylindrical base 96 may be formed on one or both of the semi-cylindrical clamping members 38, 40 of the hinged first coupling member 12", but for ease of explanation, only one of the elbow portions 30 and one of the second coupling members 28" will be described extending from the semi-cylindrical clamping members 38, 40. It is to be understood that if an elbow portion 30 and a second coupling member 28" were to extend from each of the semi-cylindrical clamping members 38, 40, then both of the elbow portions 30 and second coupling members 28" would be substantially similar.

The elbow portion 30 has an elbow configuration having a substantially cylindrical base 104 with serrated teeth 106 integrally formed on the outer surface of the cylindrical base 104 at one end of the elbow configuration. The serrated teeth 106 extend radially outward from the center of the cylindrical base 104. The serrated teeth 106 of the elbow portion 30 matingly engages the serrated teeth 100 provided on the cylindrical base 96 of the hinged first coupling member 12', 12", 12'''. A boss 108 integrally extends from the cylindrical base 104, and a threaded aperture extends through the boss 108, the cylindrical base 104 of the elbow portion 30, and the cylindrical base 96 of the hinged first coupling member 12', 12", 12'''. The threaded aperture extends along a longitudinal axis 98 substantially perpendicular to the longitudinal axis 23 of the master boom 14. A threaded fastener 112 threadingly engages the threaded aperture and provides for the loosening and tightening of the serrated teeth 100, 106. The engagement of the serrated teeth 100, 106 provides a rotational axis of adjustment of the second boom rod 24', 24", 24''' about the longitudinal axis 98 substantially perpendicular to the longitudinal axis 23 of the master boom 14.

The opposite end of the elbow configuration of the elbow portion 30 has an integral substantially cylindrical base 114 with serrated teeth 116 integrally formed therein and extending radially outward from the center of the cylindrical base 114, similar to the cylindrical base 104 and serrated teeth 106 at the other end of the elbow portion 30, as previously described. The cylindrical base 114 also has a boss 118 extending integrally therefrom with a threaded aperture 120 extending therethrough, as similarly described in boss 108 and the threaded aperture 110. The boss 118 and the cylindrical base 114 are connected to the boss 108 and the cylindrical base 104 through a rigid webbing 122. A longitudinal axis 124 of the threaded aperture 120 is substantially perpendicular to the longitudinal axis 98 of the threaded aperture 110 and the longitudinal axis 23 of the master boom 14.

To connect the second boom rod 24''' to the elbow portion 30, the second coupling member 28" provides a substantially cylindrical base 126 integrally formed on the boss 44 of the second coupling member 28". The cylindrical base 126 has serrated teeth 128 integrally formed therein and extending radially outward from the center of the cylindrical base 126 on the outside surface of the cylindrical base 126. The serrated teeth 128 matingly engage the serrated teeth 116 formed on the cylindrical base 114 of the elbow portion 30 in order to provide rotational adjustment of the second boom rod 24''' about the longitudinal axis 124 which is substantially perpendicular to longitudinal axis 98 and the longitudinal axis 23 of the master boom 14. A threaded aperture extends through the cylindrical base 126 and is coaxially aligned with the threaded aperture 120 provided in the cylindrical base 114. The threaded apertures 120 are also coaxially aligned with the threaded aperture 58 in the bosses 44 of the second coupling member 28", such that the threaded fastener 138 may extend through the threaded apertures 120 in order to loosen and tighten the serrated teeth 128 and 116 and provide rotational adjustment of the second boom rod 24''' about the longitudinal axis 124.

Figure 5:
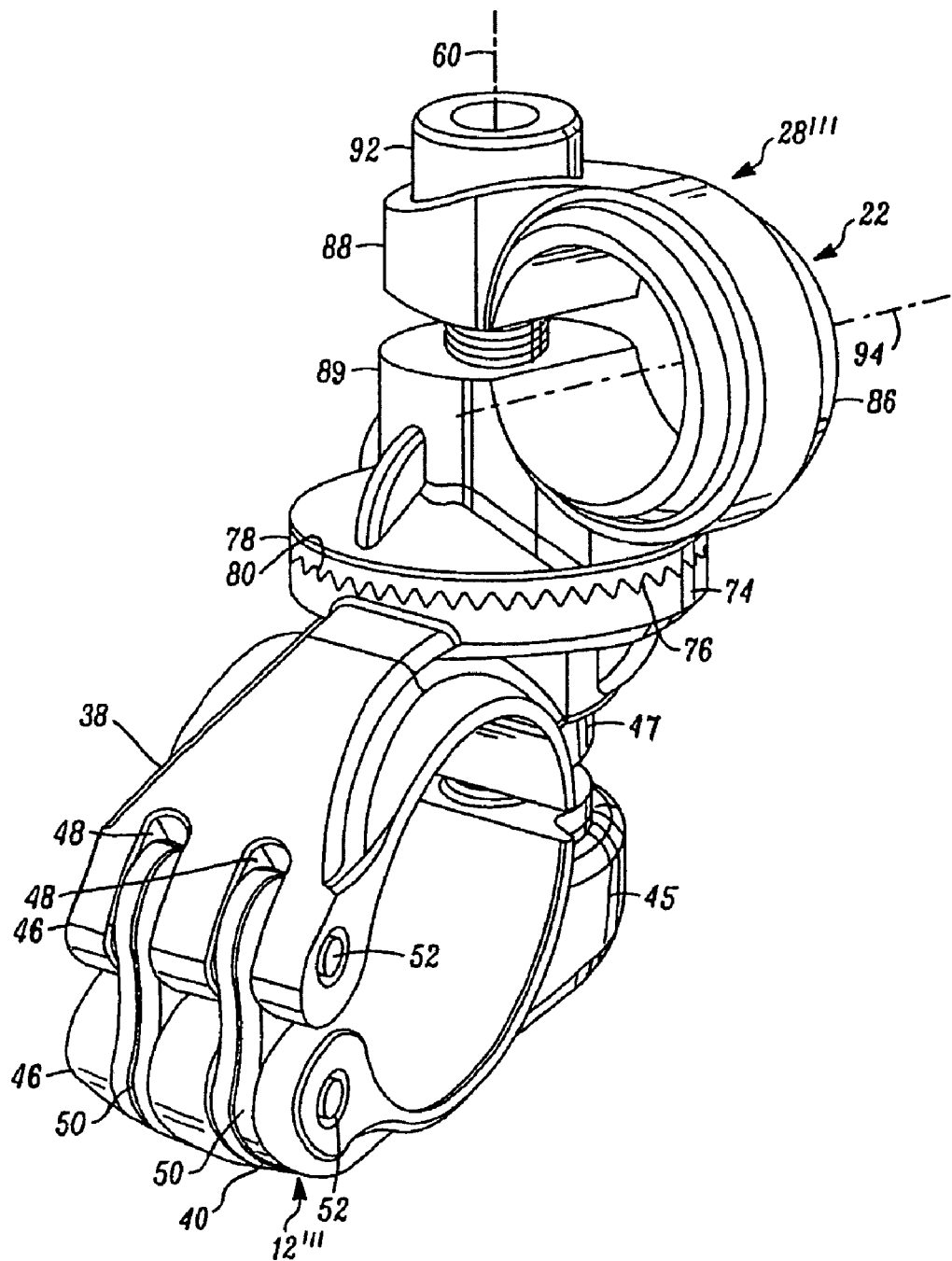
FIG. 5 is a perspective view of a swivel mount of the multi-axis coupling apparatus of the present invention.
Figure 6:
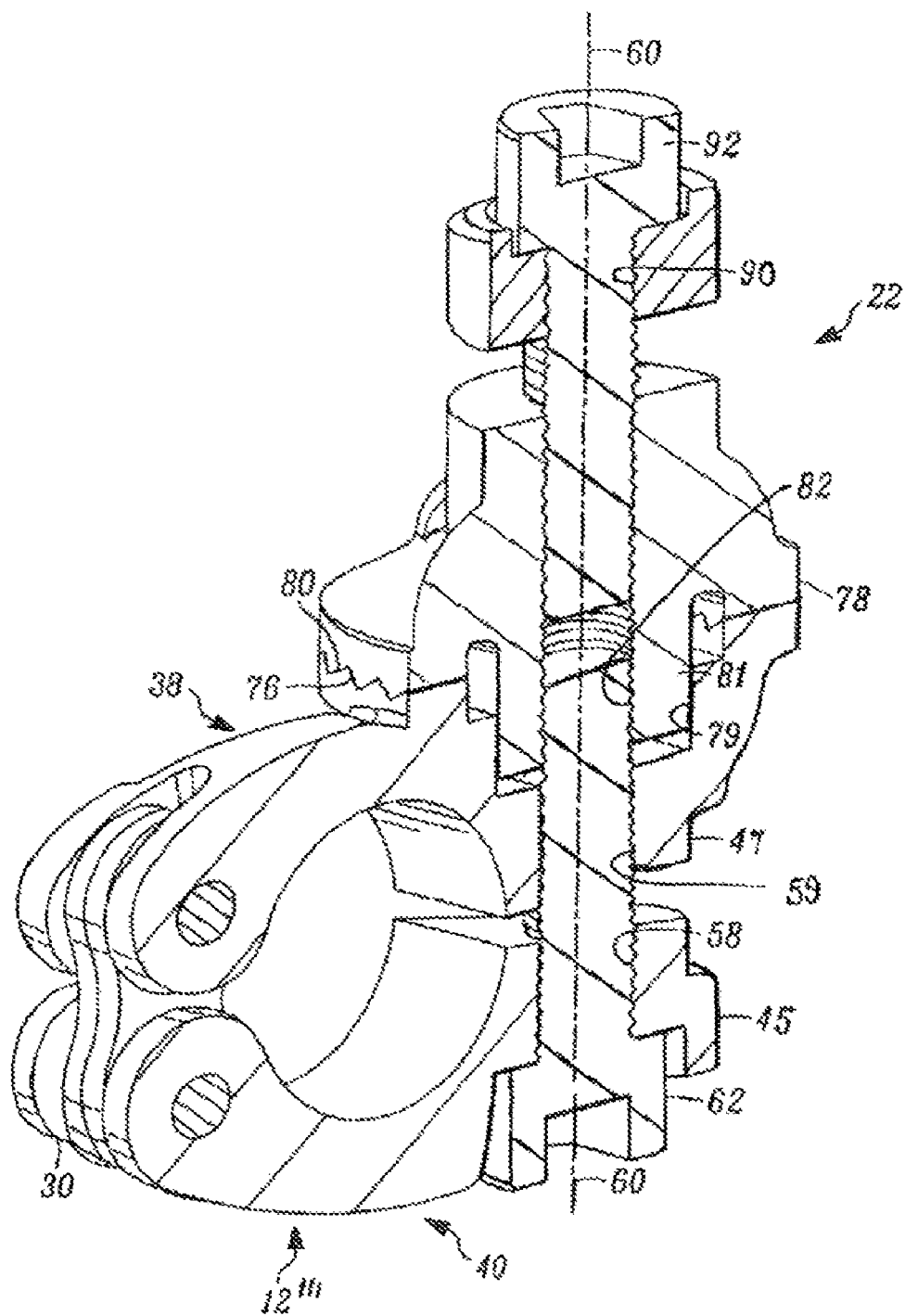
FIG. 6 is a sectional view of the swivel mount of the multi-axis coupling apparatus of the present invention.

In order to connect the second boom rod 24''' to the third boom rod 32, the multi-axis coupling apparatus 10 may provide a secondary joint in the form of a swivel mount 22, as seen in FIGS. 1-2 and 5-6. The swivel mount 22 includes the hinged first coupling member 12''', as previously described, connected to the second boom rod 24, and the second coupling member 28''' connected to the third boom rod 32. However, the boss 47 formed on one of the semi-cylindrical clamping members 38 of the hinged first coupling member 12''' has a substantially cylindrical base 74 extending integrally from the boss 47. The cylindrical base 74 of the hinged first coupling member 12''' has a plurality of serrated teeth 76 integrally formed on the outside surface of the cylindrical base 74 and extending radially outward from the center of the cylindrical base 74. The second coupling member 28''' also has a substantially cylindrical base 78 having serrated teeth 80 integrally formed therein and extending radially outward from the center of the cylindrical base 78 for matingly engaging the serrated teeth 76 on the cylindrical base 74 of the hinged first coupling member 12''', as best seen in FIGS. 5 and 6. The second coupling member 28''' has an internal pole portion 81 which is received by a bore 79 provided inside the boss 47 of the hinged first coupling member 12'''. A threaded aperture 82 extends through the pole portion 81 and is coaxially aligned with threaded apertures 59, 58 provided in bosses 45, 47 of the hinged first coupling member 12''' along the longitudinal axis 60. By having the apertures 82, 59 coaxially aligned, the threaded fastener 62 may threadingly engage the bosses 45, 47 and the threaded apertures 59 of the hinged first coupling member 12''' and the threaded aperture 82 of the second coupling member 28''' so as to loosen and tighten the engagement of the serrated teeth 76, 80 of the hinged first coupling member 12''' and the second coupling member 28'''. By loosening and tightening the engagement of the serrated teeth 76, 80, an additional rotational axis of adjustment is provided to the third boom rod 32 about the longitudinal axis 60 which is substantially perpendicular to the longitudinal axis 26 of the second boom rod 24', 24'', 24'''.

To connect the third boom rod 32 to the second coupling member 28''', a substantially C-shaped cylinder 86 extends integrally from the cylindrical base 78 of the second coupling member 28'''. The C-shaped cylinder 86 has a pair of opposing bosses 88, 89 extending integrally from the ends of the C-shaped cylinder 86. Coaxially aligned threaded apertures 82, 90 extend through the bosses 88, 89 and are coaxially aligned with threaded aperture 58, 59 along longitudinal axis 60. A threaded fastener 92 threadingly engages threaded apertures 82, 90 to tighten and loosen the C-shaped cylinder about the third boom rod 32 thereby allowing for linear adjustment of the third boom rod 32 along its longitudinal axis 26. The C-shaped cylinder 86 has a longitudinal axis 94 that is substantially perpendicular to longitudinal axis 60 and longitudinal axis 26 of the second boom rod 24 thereby providing an additional axis of adjustment for the multi-axis coupling apparatus 10.

Figure 9:
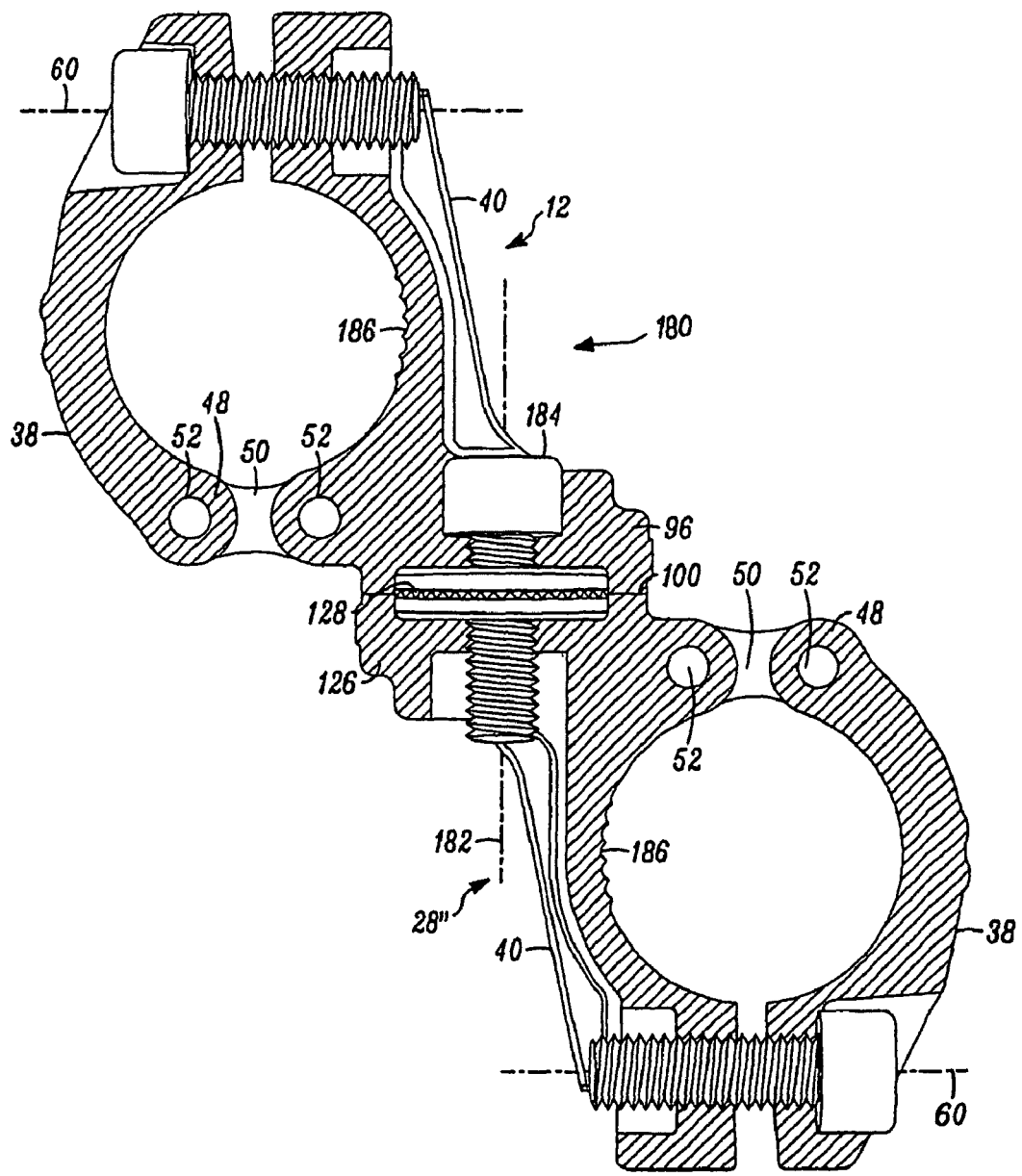
FIG. 9 is a sectional view of the alternative embodiment of the swivel mount of the multi-axis coupling apparatus of the present invention.

In an alternative embodiment, the multi-axis coupling apparatus 10 may provide a secondary joint in the form of an alternative swivel mount for connecting the second boom rod 24 to the third boom rod 32, as seen in FIG. 9. The alternative swivel mount 180 includes the hinged first coupling member 12'', as previously described, connected to the second boom rod 24, and the hinged second coupling member 28'' connected to the third boom rod 32, wherein the hinged second coupling member 28'' is substantially similar to the hinged first coupling member 12''. The first coupling member 12'' is connected to the second coupling member 28'' for rotation about an axis 182. For this purpose, the serrated teeth 128 formed on the substantially cylindrical base 96 of the first coupling member 12'' are engageable with the plurality of serrated teeth 128 provided on the substantially cylindrical base 126 of the second coupling member 28''. A threaded fastener 184 extends along the axis 182 for allowing the first coupling member 12 to be secured with respect to the second coupling member 28''. It should be noted that the axis 182 extends substantially perpendicular to the longitudinal axes 26, 33 of the second and third substantially cylindrical boom rods 24, 32 when they are held in engagement with the first and second coupling members 12'', 28'', respectively. In this manner, the alternative swivel mount 180 allows the second and third substantially cylindrical boom rods 24, 32 to rotate in substantially parallel planes. Furthermore, in applications where the second and third boom rods 24, 32 are subjected to high rotational torque, serrations may be formed on the exterior surfaces of the second and third boom rods 24, 32 for engagement with a plurality of serrations or splines 186 formed on the interior periphery of either or both of the first and second clamping members 38, 40 of the first and second coupling members 12'', 28''.

Figure 7:
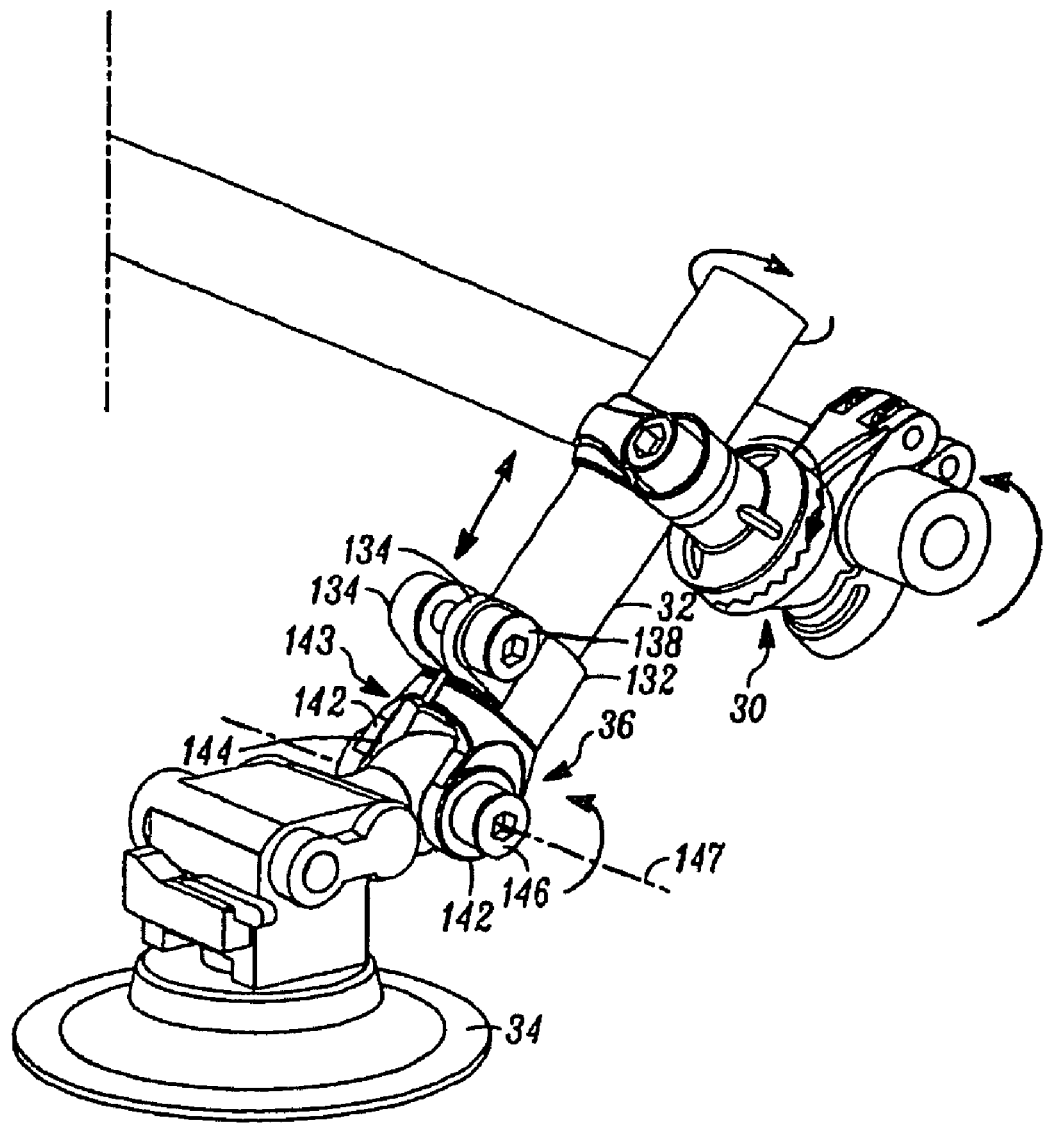
FIG. 7 is a perspective view showing a yoke mount attachment of the multi-axis coupling apparatus of the present invention.

To connect the vacuum cups 34 to the third boom rods 32, the third coupling member 36 may be utilized. A first embodiment of the third coupling member 36 is shown in FIG. 7 and provides a substantially C-shaped cylinder 132 for receiving an end of the third boom rod 32. The ends of the C-shaped cylinder 132 have a pair of integrally extending bosses 134 each having a threaded aperture extending therethrough. The threaded apertures are coaxially aligned for receiving a threaded fastener 138. The threaded fastener 138 may be loosened or tightened in order to loosen or tighten the C-shaped cylinder 132 about the third boom rod 32, thereby providing rotational adjustment of the vacuum cups 34 about the longitudinal axis 33 of the third boom rod 32.

To engage the vacuum cup 34, a yolk member 143 extends integrally from the C-shaped cylinder 132 and provides a pair of substantially parallel opposing walls 142 for receiving a swivel ball mount 144 of the vacuum cup 34. The opposing walls 142 of the yolk member 140 have threaded apertures extending therethrough which are coaxially aligned with a threaded aperture extending through the swivel ball mount 144. A threaded fastener 146 threadingly engages the apertures in the walls 142 of the yolk member 140 and the aperture in the swivel ball mount 144 in order to loosen and tighten the swivel ball mount 144 with respect to the yolk member 140. The loosening and tightening of the swivel ball mount 144 allows for rotational adjustment of the vacuum cup 34 about a longitudinal axis 147 coaxially aligned with the axis of the threaded fastener 146.

Figure 8:
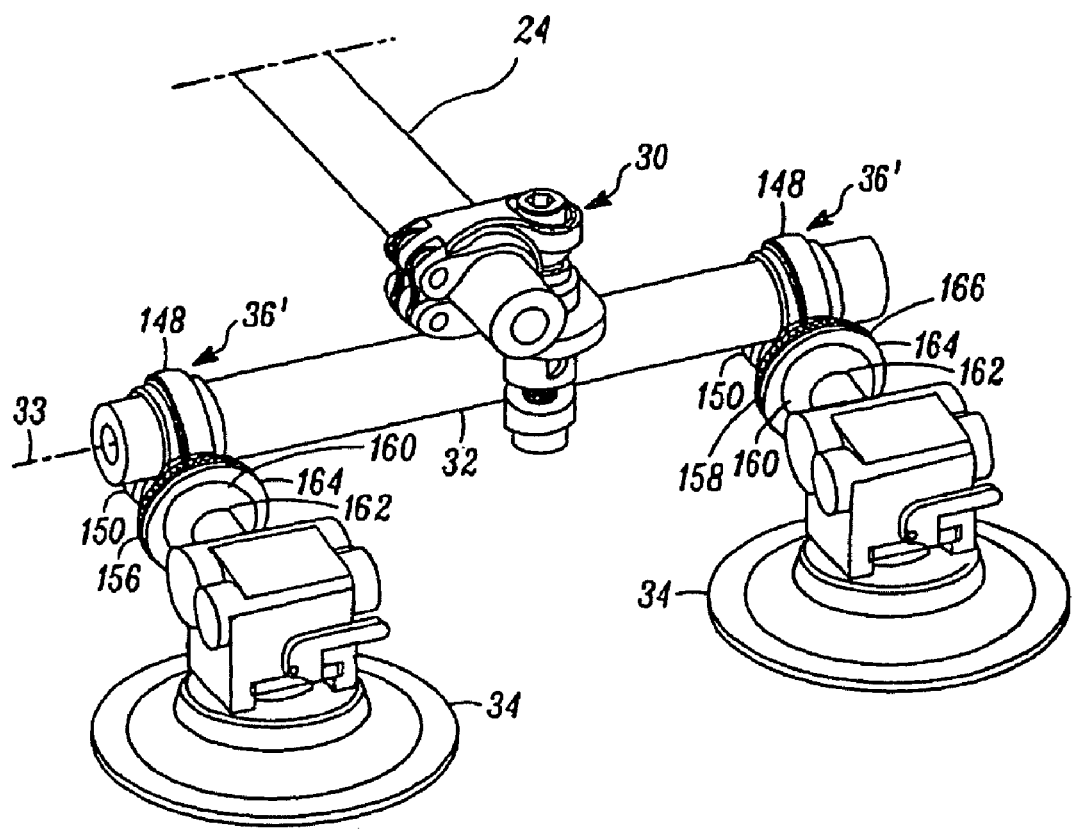
FIG. 8 is a perspective view showing the serrated ball mount attachment of the multi-axis coupling apparatus of the present invention.

In another embodiment, the third coupling member 36' utilized to connect the vacuum cup 34 to the third boom rod 32 may take on a different configuration, as exhibited in FIG. 8. The third coupling member 36' provides a substantially C-shaped cylinder 148 for receiving the third boom rod 32. The C-shaped cylinder 148 provides a pair of integrally extending bosses 150 wherein threaded apertures extend coaxially through the bosses 150. A threaded fastener threads through the threaded apertures in order to tighten and loosen the C-shaped cylinder 148 about the third boom rod 32. Thus, the third coupling member 36' may be provided for linear and rotational adjustment of the vacuum cups 34 along and about the longitudinal axis 33 of the third boom rod 32.

To connect the vacuum cup 34 to the C-shaped cylinder 148, a substantially cylindrical base 156 extends integrally from one of the bosses 150 of the C-shaped cylinder 148. The cylindrical base 156 has serrated teeth 158 integrally formed on the outer surface of the cylindrical base 156 and extending radially outward from the center of the cylindrical base 156. A modified swivel ball mount 160 has a semi-hemispherical end 162 with a substantially cylindrical base 164 extending therefrom.

The cylindrical base 164 has a plurality of serrated teeth 166 integrally formed on the outer surface of the cylindrical base 164 and extending radially outward from the center of the cylindrical base 164 to matingly engage the serrated teeth 158 on the cylindrical base 156 of the third coupling member 36'. A threaded aperture extends through the cylindrical bases 156, 164 and into the semi-hemispherical end 162. The threaded aperture is coaxially aligned with the threaded aperture extending through the bosses 150 such that the threaded fastener may extend therein, thereby tightening and loosening the serrated teeth 158, 166. The tightening and loosening of the serrated teeth 158, 166 allows for rotational adjustment of the vacuum cup 34 about a longitudinal axis of the threaded fastener.

Figure 10:
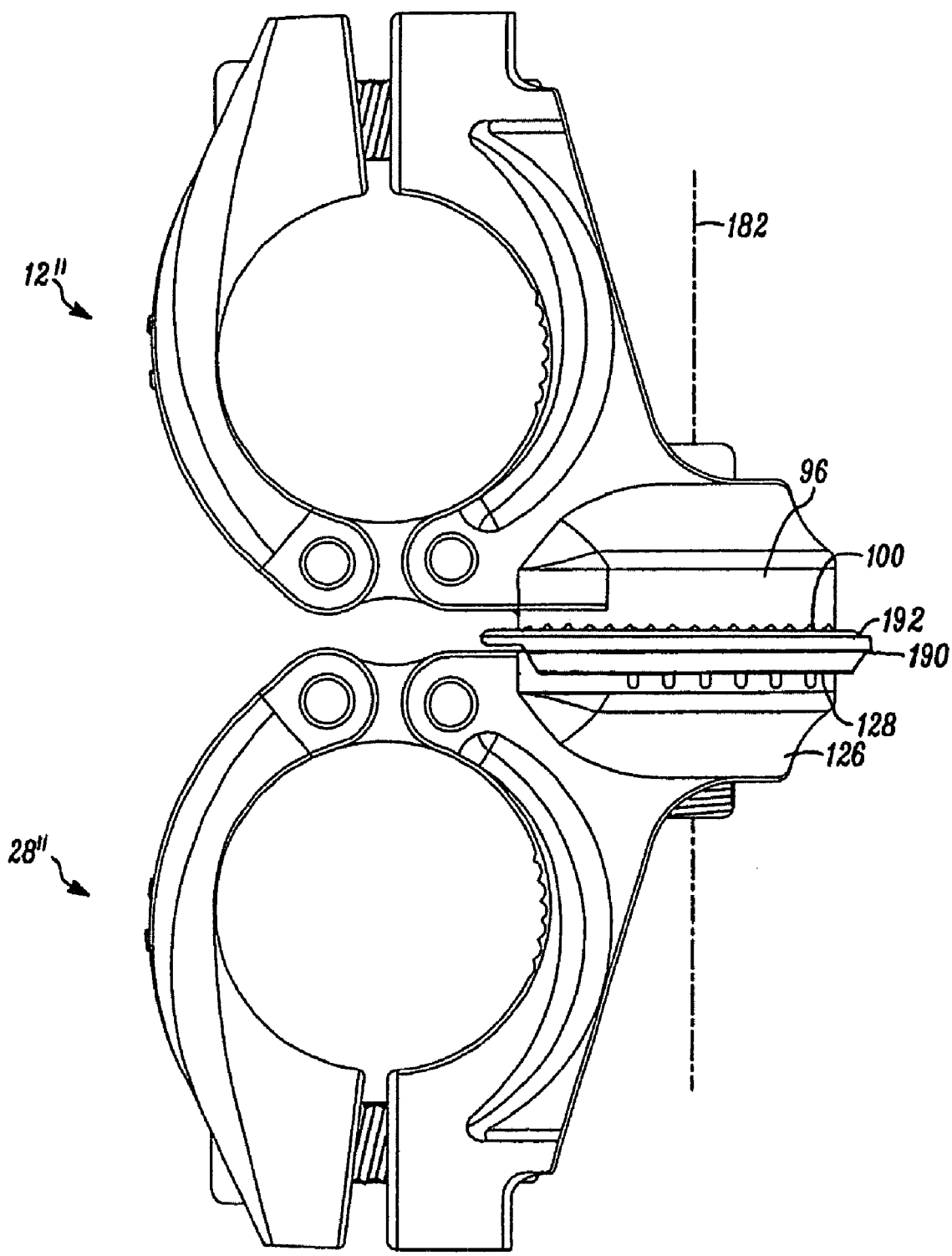
FIG. 10 is a side view of the alternative embodiment of the swivel mount of the multi-axis coupling apparatus of the present invention having a position indicator disc.

In any of the previously-discussed embodiments, it is contemplated that a position indicator disc 190 may be provided to enable measurement of the angle formed between the first coupling member 12'' and the second coupling member 28'', as shown in FIG. 10. Particularly, the position indicator disc 190 is seated between the plurality of serrated teeth 100 of the substantially cylindrical base 96 of the first coupling member 12", and the plurality of serrated teeth 128 of the substantially cylindrical base 126 of the second coupling member 28". The position indicator disc 190 is greater in diameter than the substantially cylindrical bases 96, 126. Thus, the position indicator disc 190 extends radially outward from the substantially cylindrical bases 96, 126 when it is seated between them. Accordingly, indicia are provided on an axial face 192 of the position indicator disc 190 so that the indicia on the axial face provide a measurement of the angle formed between the first coupling member 12" and the second coupling member 28" to an observer who is viewing the indicia on the axial face 192 of the position indicator disc from a location that is axially above or below the substantially cylindrical bases 96, 126 of the first and second coupling members 12", 28", respectively.

In operation, the first hinged member 12', 12" may be opened in a clam-type fashion or may be slid over the master boom 14 so as to assemble the first hinged member 12', 12" to the master boom 14. Once the position for the first hinged member 12', 12" is determined, the threaded fastener 62 on the bosses 44 is tightened so as to secure the hinged first coupling member 12', 12" to the master boom 14. The second boom rod 24', 24", 24''' may then be inserted into the second coupling member 28. The position of the second boom rod 24', 24", 24''' is determined, and the threaded fasteners 112, 138 are tightened to secure the second boom rod 24', 24", 24''' in a desired location. The swivel mount 22 is attached to the second boom rod 24', 24", 24''' by using the hinged first coupling member 12', 12" of the swivel mount, and the third boom rod 32 is then connected to the second coupling member 28''' of the swivel mount 22. The position of the third boom rod 32 is determined, and the threaded fasteners 62, 92, of the second coupling member 28''' are secured to tighten the position of the third boom rod 32. The vacuum cups 34 are then connected to the third boom rod 32 through the use of the third coupling members 36. Once the position of the vacuum cups 34 is determined, the threaded fasteners in the third coupling members 36 are tightened, and the position of the vacuum cup 34 is secured. The multi-axis coupling apparatus 10 is ready for operation. If further adjustment is required or if different parts are utilized, the multi-axis coupling apparatus 10 lends itself to simple adjustability and great flexibility so as to easily adapt to any configuration.

While the invention has been described in connection with what is presently considered to be the most practical and preferred embodiment, it is to be understood that the invention is not to be limited to the disclosed embodiments, but to the contrary, it is intended to cover various modifications or equivalent arrangements included within the spirit and scope of the appended claims. The scope is to be accorded the broadest interpretation so as to encompass all such modifications and equivalent structures as is performed under the law.

What is claimed is:

1. A multi-axis coupling apparatus for adjustably mounting modular tooling members, comprising:
   a first substantially cylindrical boom rod;
   a second substantially cylindrical boom rod;
   a primary joint releasably connected to a first substantially cylindrical boom rod and a second substantially cylindrical boom rod, and said primary joint having a first coupling member connected to a second coupling member;
   said first coupling member independently releasably connectable to said first substantially cylindrical boom rod for providing linear and rotational adjustment of said first coupling member with respect to said first substantially cylindrical boom rod along and about a longitudinal axis of said first substantially cylindrical boom rod, and said first coupling member having a first clamping member pivotally connected to a second clamping member by at least one substantially arcuate link which is configured to complement the exterior surface of said first substantially cylindrical boom rod;
   said second coupling member independently releasably connectable to said second substantially cylindrical boom rod for providing linear and rotational adjustment along and about a longitudinal axis of said second substantially cylindrical boom rod, wherein said first coupling member and said second coupling member are capable of being releasably secured in a rigid position relative to one another;
   a secondary joint releasably connected to said second substantially cylindrical boom rod, said secondary joint having a third coupling member connected to a tooling member;
   said third coupling member having a yolk member extending integrally from a C-shaped cylinder, said C-shaped cylinder releasably connected to said second substantially cylindrical boom rod for rotational adjustment of said third coupling member with respect to said second substantially cylindrical boom rod along and about a longitudinal axis of said second substantially cylindrical boom rod; and
   said tooling member connected to said second coupling member, said tooling member having a swivel ball mount pivotally connected to said yolk member for pivotal adjustment of said tooling member with respect to said second coupling member.

2. The apparatus stated in claim 1, further comprising:
   a plurality of longitudinally extending serrations formed on an exterior surface of said first substantially cylindrical boom rod; and
   a plurality of serrations formed on said first clamping member for engaging said plurality of serrations on said first substantially cylindrical boom rod for resisting rotation of said first substantially cylindrical boom rod with respect to said first clamping member.

3. A multi-axis coupling apparatus for adjustably mounting modular tooling members, comprising:
   a primary joint connectable to a first substantially cylindrical boom rod and a second substantially cylindrical boom rod, and said primary joint having a first coupling member connected to a second coupling member;
   said first coupling member releasably connectable to said first substantially cylindrical boom rod for providing linear and rotational adjustment of said first substantially cylindrical boom rod along and about the longitudinal axis of said first substantially cylindrical boom rod, and said first coupling member having a first clamping member pivotally connected to a second clamping member by at least one substantially arcuate link, wherein said arcuate link is configured to complement the exterior surface of said first substantially cylindrical boom rod;
   said second coupling member releasably connectable to said second substantially cylindrical boom rod for adjustably mounting said second substantially cylindrical boom rod;
   said first coupling member having a first substantially cylindrical base having a plurality of serrated teeth;
   said second coupling member having a second substantially cylindrical base having a plurality of serrated teeth for matingly engaging said serrated teeth of said first substantially cylindrical base for rotatably adjusting said first coupling member with respect to said second coupling member about a first axis;

said second coupling member having a substantially C-shaped structure releasably connectable to said second substantially cylindrical boom rod;

said first coupling member having a pair of bosses and a threaded aperture extending through each of said bosses in which a fastener may be received for releasably connecting said first coupling member to said first cylindrical boom rod, wherein said threaded apertures are aligned along said first axis; and said second coupling member having a threaded bore extending along said first axis, wherein said fastener engages said threaded bore in said second coupling member and said threaded apertures in said first coupling member to hold said second coupling member in mating engagement with said first coupling member.

4. A multi-axis coupling apparatus for adjustably mounting modular tooling members, comprising:

a primary joint connectable to a first substantially cylindrical boom rod and a second substantially cylindrical boom rod, and said primary joint having a first coupling member connected to a second coupling member;

said first coupling member releasably connectable to said first substantially cylindrical boom rod for providing linear and rotational adjustment of said first substantially cylindrical boom rod along and about a longitudinal axis of said first substantially cylindrical boom rod;

said first coupling member having a first clamping member pivotally connected to a second clamping member by at least one substantially arcuate link, wherein said arcuate link is configured to complement an exterior surface of said first substantially cylindrical boom rod;

said second coupling member releasably connectable to said second substantially cylindrical boom rod for adjustably mounting said second substantially cylindrical boom rod;

a secondary joint connectable to said second substantially cylindrical boom rod, and said secondary joint having a third coupling member connected to a fourth coupling member;

said third coupling member releasably connectable to said second substantially cylindrical boom rod for providing linear and rotational adjustment of said second substantially cylindrical boom rod along and about said longitudinal axis of said second substantially cylindrical boom rod;

said fourth coupling member releasably connectable to said third substantially cylindrical boom rod for providing linear and rotational adjustment of said third substantially cylindrical boom rod along and about a longitudinal axis of said third substantially cylindrical boom rod;

a third joint releasably connectable to said third substantially cylindrical boom rod and to one of said tooling members, and said third joint having a fifth coupling member connectable to said tooling member for rotatably adjusting said tooling member with respect to said fifth coupling member;

said primary joint having an elbow portion connected to said first coupling member and to said second coupling member for rotatably adjusting said second coupling member with respect to said first coupling member about a first axis and a second axis, wherein said first axis extends substantially perpendicular to said second axis;

said first coupling member having a first substantially cylindrical base having a plurality of serrated teeth;

said elbow portion having a second substantially cylindrical base having a plurality of serrated teeth for matingly engaging said serrated teeth of said first substantially cylindrical base for rotatably adjusting said first coupling member with respect to said elbow portion about said first axis;

said elbow portion having a third substantially cylindrical base having a plurality of serrated teeth;

said second coupling member having a fourth substantially cylindrical base having a plurality of serrated teeth for matingly engaging said serrated teeth of said third substantially cylindrical base for rotatably adjusting said second coupling member with respect to said elbow portion about said second axis; and said second coupling member having a first clamping member and a second clamping member connected by at least one substantially arcuate link for releasably connecting said second coupling member to said second substantially cylindrical boom rod.

5. The apparatus stated in claim 4, further comprising:

said third coupling member having a fifth substantially cylindrical base having a plurality of serrated teeth;

said fourth coupling member having a sixth substantially cylindrical base having a plurality of serrated teeth for matingly engaging said serrated teeth of said fifth substantially cylindrical base for rotatably adjusting said fourth coupling member with respect to said third coupling member about a third axis;

said fifth coupling member releasably connectable to said third substantially cylindrical boom rod for providing rotatable adjustment about said longitudinal axis of said third substantially cylindrical boom rod, and said fifth coupling member having a yolk member extending integrally from a C-shaped cylinder; and a tooling member connected to said fifth coupling member, and said tooling member having a swivel ball mount pivotally connected to said yolk member for pivotal adjustment of said tooling member with respect to said fifth coupling member about a fourth axis, wherein said fourth axis extends substantially perpendicular to said longitudinal axis of said third substantially cylindrical boom rod.

6. The apparatus stated in claim 4, further comprising:

said third coupling member having a fifth substantially cylindrical base having a plurality of serrated teeth;

said fourth coupling member having a sixth substantially cylindrical base having a plurality of serrated teeth for matingly engaging said serrated teeth of said fifth substantially cylindrical base for rotatably adjusting said fourth coupling member with respect to said third coupling member about a third axis;

said fifth coupling member releasably connectable to said third substantially cylindrical boom rod for providing linear and rotational adjustment along and about said longitudinal axis of said third substantially cylindrical boom rod, and said fifth coupling member having a seventh substantially cylindrical base having a plurality of serrated teeth; and said tooling member having an eighth substantially cylindrical base having a plurality of serrated teeth for matingly engaging said serrated teeth of said seventh substantially cylindrical base for rotatably adjusting said tooling member with respect to said fifth coupling member about a fourth axis, wherein said fourth axis extends substantially perpendicular to said longitudinal axis of said third substantially cylindrical boom rod.

7. A multi-axis coupling apparatus for adjustably mounting modular tooling members, comprising:
- a primary joint connectable to a first substantially cylindrical boom rod and a second substantially cylindrical boom rod, and said primary joint having a first coupling member connected to a second coupling member;
- said first coupling member releasably connectable to said first substantially cylindrical boom rod for providing linear and rotational adjustment of said first substantially cylindrical boom rod along and about a longitudinal axis of said first substantially cylindrical boom rod;
- said first coupling member having a first clamping member pivotally connected to a second clamping member by at least one substantially arcuate link, wherein said arcuate link is configured to complement an exterior surface of said first substantially cylindrical boom rod;
- said second coupling member releasably connectable to said second substantially cylindrical boom rod for adjustably mounting said second substantially cylindrical boom rod;
- a second joint connectable to said second substantially cylindrical boom rod, and said secondary joint having a third coupling member connected to a fourth coupling member;
- said third coupling member releasably connectable to said second substantially cylindrical boom rod for providing linear and rotational adjustment of said second substantially cylindrical boom rod along and about said longitudinal axis of said second substantially cylindrical boom rod;
- said fourth coupling member releasably connectable to said third substantially cylindrical boom rod for providing linear and rotational adjustment of said third substantially cylindrical boom rod along and about a longitudinal axis of said third substantially cylindrical boom rod;
- a third joint releasably connectable to said third substantially cylindrical boom rod and to one of said tooling members, and said third joint having a fifth coupling member connectable to said tooling member for rotatably adjusting said tooling member with respect to said fifth coupling member;
- said first coupling member and said second coupling member formed integrally, and said second coupling member having a substantially C-shaped structure releasably connectable to said second substantially cylindrical boom rod;
- said longitudinal axis of said second substantially cylindrical boom rod extends substantially perpendicular to said longitudinal axis of said first substantially cylindrical boom rod;
- said third coupling member having a first substantially cylindrical base having a plurality of serrated teeth;
- said fourth coupling member having a second substantially cylindrical base having a plurality of serrated teeth for matingly engaging said serrated teeth of said first substantially cylindrical base for rotatably adjusting said fourth coupling member with respect to said third coupling member about a first axis;
- said fifth coupling member releasably connectable to said third substantially cylindrical boom rod for providing rotatable adjustment of said third substantially cylindrical boom rod about said longitudinal axis of said third substantially cylindrical boom rod, and said fifth coupling member having a yolk member extending integrally from a C-shaped cylinder; and
- one of said tooling members connected to said fifth coupling member, and said tooling member having a swivel ball mount pivotally connected to said yolk member for pivotal adjustment of said tooling member with respect to said fifth coupling member about a second axis, wherein said second axis extends substantially perpendicular to said longitudinal axis of said third substantially cylindrical boom rod.

8. A multi-axis coupling apparatus for adjustably mounting modular tooling members, comprising:
- a first substantially cylindrical boom rod;
- a second substantially cylindrical boom rod;
- a primary joint releasably connected to said first boom rod and said second boom rod, and said primary joint having a first coupling member and a second coupling member;
- said first coupling member releasably connectable to said first boom rod, said first coupling member defining a bore through which said first boom rod extends, wherein said first boom rod is slidably within said bore for linear adjustment of the position of said first coupling member along said first boom rod;
- said first coupling member and said second coupling member releasably connected for rotatable adjustment with respect to one another;
- said first coupling member having a pair of threaded apertures that extend along a longitudinal axis;
- said second coupling member having a threaded bore extending coaxially with said pair of threaded apertures along said longitudinal axis; and
- a fastener that engages said pair of threaded apertures in said first coupling member and said threaded bore in said second coupling member to selectively restrain sliding of said first boom rod with respect to said first coupling member and to selectively restrain rotation of said first coupling member with respect to said second coupling member.

9. The apparatus stated in claim 8, further comprising:
- said first coupling member having a first substantially cylindrical base having a plurality of serrated teeth;
- said second coupling member having a second substantially cylindrical base having a plurality of serrated teeth for matingly engaging said serrated teeth of said first substantially cylindrical base for rotatably adjusting said first coupling member with respect to said second coupling member about a first axis; and
- said second coupling member having a substantially C-shaped structure releasably connectable to said second substantially cylindrical boom rod.

10. The apparatus stated in claim 8, further comprising:
- said first coupling member and said second coupling member, configured such that said first and second substantially cylindrical boom rods rotate in parallel planes with respect to one another.

11. The apparatus stated in claim 8, further comprising:
- an indicator disc disposed between said hinged first coupling member and said second coupling member and having indicia disposed on an axial surface thereof for measuring the angular relationship of said hinged first coupling member with respect to said second coupling member.

\* \* \* \* \*

UNITED STATES PATENT AND TRADEMARK OFFICE
CERTIFICATE OF CORRECTION

| | | |
|---|---|---|
| PATENT NO. | : 8,162,557 B2 | Page 1 of 1 |
| APPLICATION NO. | : 11/453535 | |
| DATED | : April 24, 2012 | |
| INVENTOR(S) | : Van Zile, III et al. | |

It is certified that error appears in the above-identified patent and that said Letters Patent is hereby corrected as shown below:

In Col. 3, line 10, please delete "12', 12", 12'" and insert --12', 12", 12'"--;

In Col. 3, line 13, please delete "24', 24", 24'" and insert --24', 24", 24'"--; and In Col. 3, line 19, please delete "28', 28", 28''" and insert --28', 28", 28'"--.

Signed and Sealed this
Fourteenth Day of August, 2012

David J. Kappos
*Director of the United States Patent and Trademark Office*